United States Patent [19]

Martenas

[11] 4,426,043
[45] Jan. 17, 1984

[54] FORAGE HARVESTER DRIVE APPARATUS

[75] Inventor: Wayne B. Martenas, New Holland, Pa.

[73] Assignee: Sperry Corporation, New Holland, Pa.

[21] Appl. No.: 349,436

[22] Filed: Feb. 16, 1982

[51] Int. Cl.³ ............................................ B02C 18/24
[52] U.S. Cl. .............................. 241/101.2; 241/101.7; 241/222
[58] Field of Search ....................... 74/15.2, 15.6, 325, 74/665 R, 665 F, 665 G, 665 GA, 665 GE; 241/101.2, 101.7, 222, 223, 224

[56] References Cited

U.S. PATENT DOCUMENTS

| | | | |
|---|---|---|---|
| 2,872,003 | 2/1959 | Nussbaumer . | |
| 3,889,887 | 6/1975 | Wagstaff et al. | 241/101.2 |
| 4,020,995 | 5/1977 | Purrer | 241/101.2 |
| 4,049,207 | 9/1977 | Storm et al. | 241/101.7 |
| 4,220,289 | 9/1980 | Phillips et al. | 241/222 X |
| 4,223,846 | 9/1980 | Priepke et al. | 241/101.7 X |
| 4,263,772 | 4/1981 | Phillips et al. . | |

*Primary Examiner*—Mark Rosenbaum
*Attorney, Agent, or Firm*—Frank A. Seemar; Darrell F. Marquette; Larry W. Miller

[57] ABSTRACT

In a forage harvester, the cutterhead, feedrolls and attachment drive is usually accomplished by combinations of belts, chains and gears which are exposed to contamination from debris associated with harvesting operations. This is avoided by providing such drives housed in a single housing having an external chain drive including interchangeable sprockets for varying feedroll speed. This provides a quick change for varying the length of cut of crop material being fed to the cutterhead.

5 Claims, 5 Drawing Figures

FORAGE HARVESTER DRIVE APPARATUS

BACKGROUND OF THE INVENTION

This invention relates generally to solid material comminution and, more particularly, to apparatus for controlling drive of a forage harvester cutterhead, feedrolls and attachment.

In a pull-type forage harvester, the cutterhead feedrolls and attachment drive train is usually accomplished by combinations of belts, chains and gears which are exposed to contamination from debris associated with harvesting operations. A limitation of such an arrangement is that such exposure is directly related to unreliability and increased maintenance. However, while it is desirable to protect some portions of the drive train it is also desirable to have ready access to other portions of the drive train, such as for changing feedroll speed and the like.

The foregoing illustrates limitations of the known prior art. Thus, it is apparent that it would be advantageous to provide an alternative directed to overcoming one or more of the limitations as set forth above. Accordingly, a suitable alternative is to provide a housing for such drives which permits quick access to certain portions of the drive train.

SUMMARY OF THE INVENTION

In one aspect of the present invention, this is accomplished by providing a forage harvester drive apparatus including a first and second gearbox each having an input. An output of the first gearbox provides input to the second gearbox. A drive member and a driven member extend out of the second gearbox where they are interconnected. The drive member includes a plurality of interchangeable drive sprockets. The driven member is an upper feedroll drive shaft. A lower feedroll drive shaft is interconnected with the upper feedroll drive shaft inside the second gearbox.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
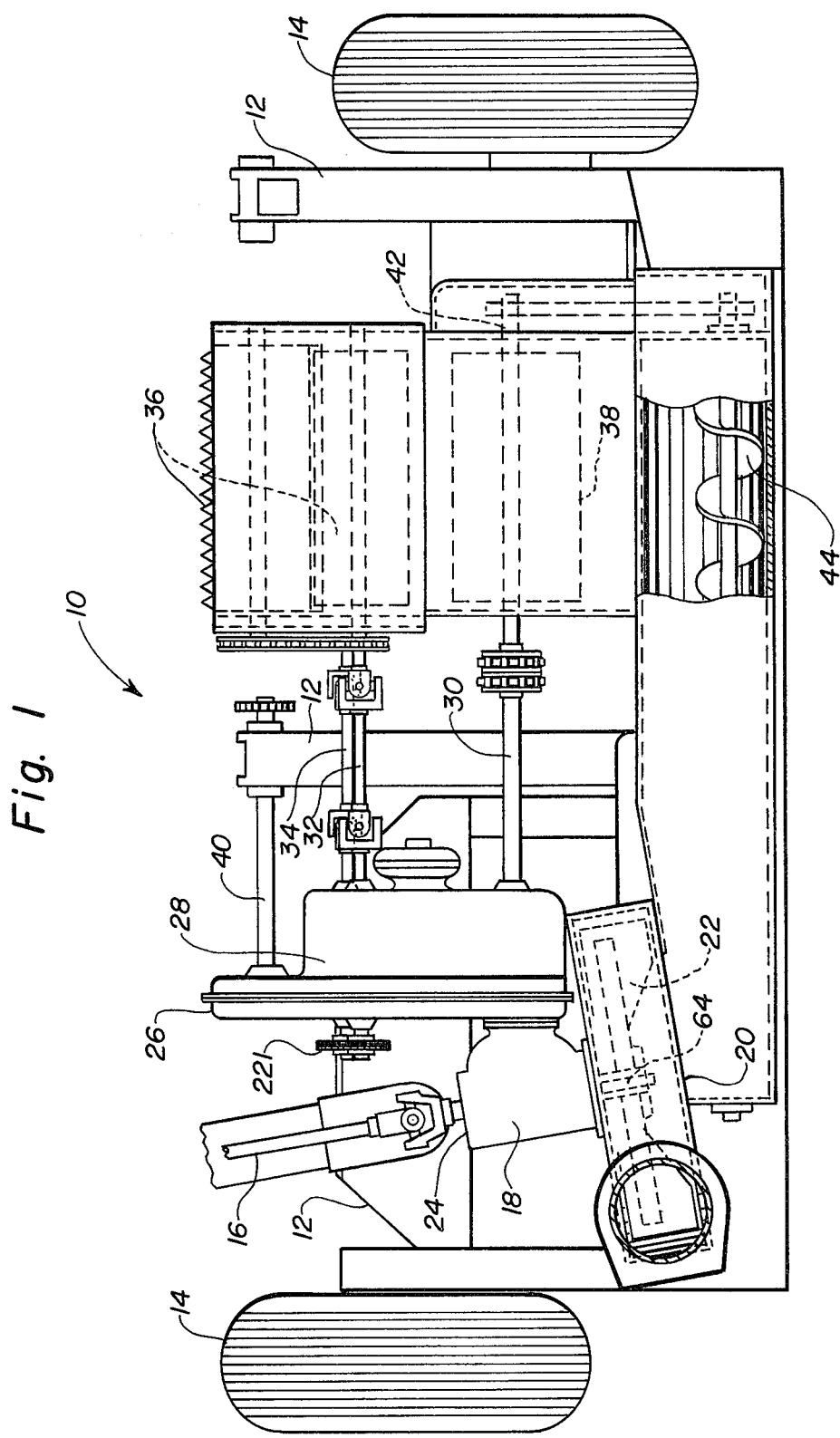
FIG. 1 is a plan view illustrating an embodiment of an exemplary forage harvester used in combination with the present invention.

An exemplary pull-type forage harvester is generally designated 10, FIG. 1 and includes a mobile frame 12 having wheels 14 mounted thereon. Power is supplied to harvester 10 by a power takeoff (PTO) shaft 16 connected to receive rotary drive from a towing apparatus such as an agricultural tractor (not shown). Shaft 16 rotates to provide a 1000 rpm input to main gearbox 18. A first output from gearbox 18 is supplied to a well known blower 20 having a fan 22 which can be operated at two output speeds of about 1000 rpm and about 720 rpm due to a two-speed gear arrangement described below in greater detail.

A housing 24 of main gearbox 18 is connected to a housing 26 of a reversing gearbox 28. A second output from gearbox 18 provides an input to gearbox 28 at about 850 rpm. As described below in greater detail, input to reversing gearbox 28 provides a first output to a shaft 30 for driving a cutterhead 38, provides second and third outputs to upper and lower feedroll drive shafts 32,34, respectively, for driving feed rolls 36 and provides a fourth output to shaft 40 for driving a harvester attachment (not shown). Also, a shaft 42 from cutterhead 38 drives an auger 44 for moving chopped crop material to blower 20.

TWO SPEED BLOWER

Figure 2:
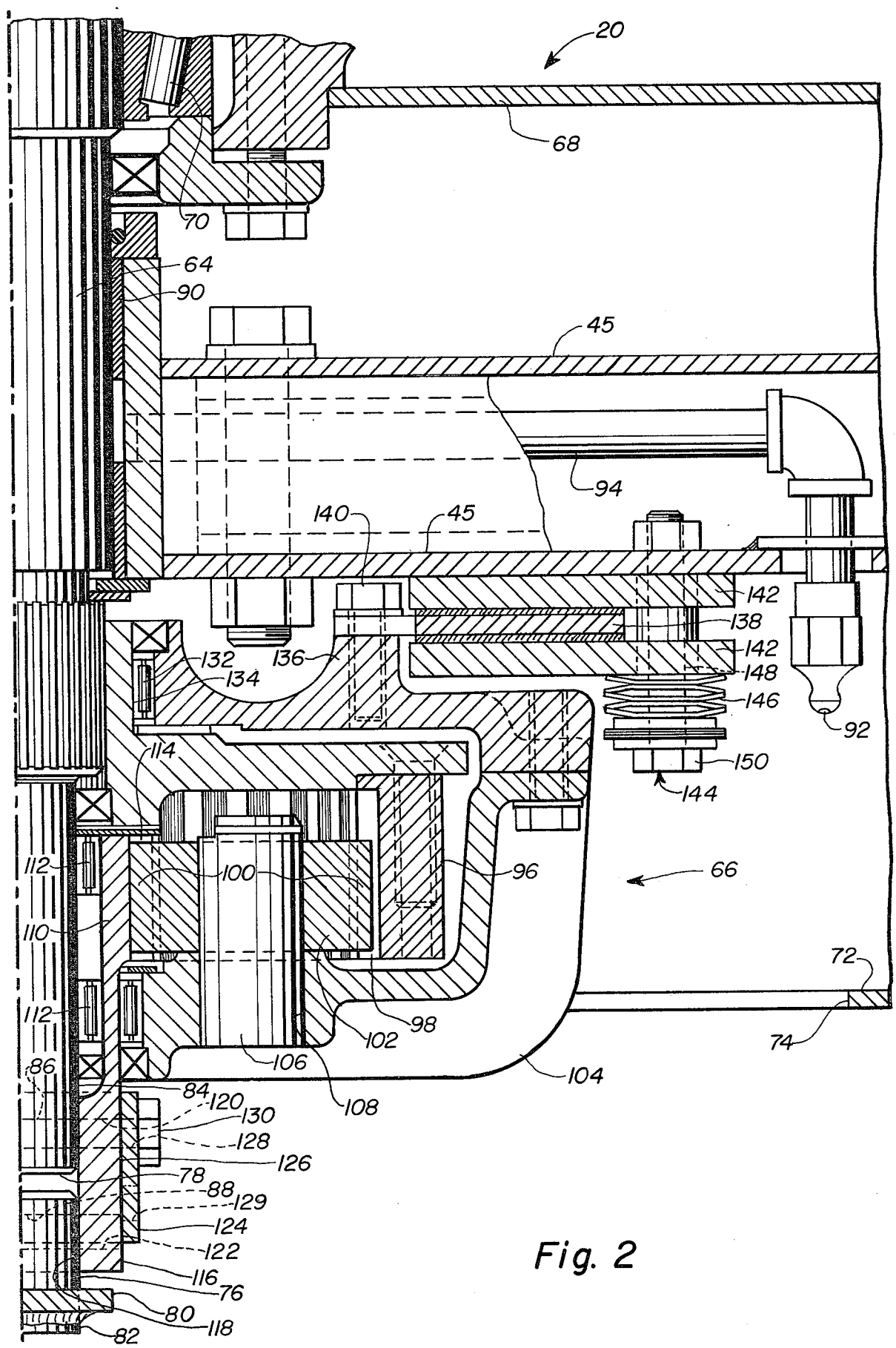
FIG. 2 is a partial plan view illustrating an embodiment of a two-speed planetary blower drive used in combination with the present invention.

The first output from gearbox 18 is provided through a rotating shaft 64, FIG. 2, which is an extension of PTO shaft 16 and operates from gearbox 18 at the single input speed of shaft 16, e.g. about 1000 rpm, to drive blower 20. A novel two-speed planetary apparatus 66 of blower 20 is driven by shaft 64 to provide a means having a single speed rotating input for producing a two-speed rotating output. By two-speed rotating output is meant that in a first mode, fan 22, connected to a hub 45, is rotated at about 1000 rpm which is the input speed of shaft 64. In a second mode, fan 22 is rotated at a substantially reduced speed of about 720 rpm. Although blower 20 is illustrated herein for use with a forage harvester, it will be clearly understood that the novel two-speed feature of planetary apparatus 66, to be hereinafter described in detail, is adaptable for use on many apparatus with a single speed rotating input where a two-speed rotating output is desirable.

Shaft 64 protrudes through front metal sheet 68 of blower 20 and is bearing mounted at 70 for rotating between front sheet 68 and rear metal sheet 72. An opening 74 can be provided, if desired, in rear sheet 72.

A fixed member, such as a torque arm 76, is provided adjacent an end 78 of shaft 64. Arm 76 is preferably welded to an extending flange 80 of harvester 10. Torque arm 76 is axially aligned with shaft 64 and has an outside diameter 82 which measures substantially the same as an outside diameter 84 of shaft 64. An aperture 86 is provided in shaft 64 adjacent end 78 transverse to the shaft axis. A similar aperture 88 is provided in torque arm 76.

Hub 45 of fan 22 is mounted on shaft 64 at bushing 90 for rotation on shaft 64. A lubrication fitting 92 and conduit 94 are operably connected for conducting lubricant to bushing 90.

A ring gear 96 is splined to shaft 64 for rotation therewith. Gear 96 has teeth 98 intermeshed with teeth 100 of a planetary gear 102 which is connected to a planet carrier 104 via a press fit pin member 106 inserted through gear 102 and pressed into a bore 108 formed in carrier 104.

A sun gear 110 is bearing mounted at 112 on shaft 64. Sun gear 110 includes teeth 114 intermeshed with teeth 100 of planetary gear 102. Sun gear 110 includes an extended portion 116 which forms a sleeve having an inside diameter 118 in simultaneous abutment with outside diameters 84,82 of shaft 64 and torque arm 76, respectively. An aperture 120 formed in extended portion 116 is aligned with aperture 86 of shaft 64 and another aperture 122 in portion 116 is aligned with aperture 88 of torque arm 76.

A tubular ring or sleeve 124 is in sliding engagement with an outer peripheral surface 126 of extended portion 116 of sun gear 110. At least one aperture 128, and preferably, another aperture 129, is formed in sleeve 124. Thus, apertures 128,129 can be moved into alignment with apertures 120 and 122 of sun gear 110 and apertures 86,88 of shaft 64 and torque arm 76, respectively. A pin 130 can be removably inserted through th aligned apertures thus securing sun gear 110 to either of shaft 64 for rotation therewith and to torque arm 76 for maintaining sun gear 110 stationary relative to any rotation of shaft 64.

Planet carrier 104 is bearing mounted at 132 on a surface 134 of ring gear 96. A portion 136 of carrier 104 carries a friction plate 138 attached thereto by bolt 140. Plate 138 extends between a pair of opposed clutch plates 142 one of which is resiliently urged toward another for frictional engagement with plate 138. Such resilient urging is accomplished by a bolt 144 connecting clutch plates 142 and hub 45 and including a plurality of resilient washers 146 retained in compression on a shaft 148 of bolt 144 between a bolt head 150 and one of the clutch plates 142.

When it is desired to move fan 22 at the same rpm of input shaft 64, ring 124 is moved to a position wherein pin 130 is simultaneously engaged with apertures 128,120 and 86 so that sun gear 110 is fixedly connected for rotation with input shaft 64. In this first mode, since sun gear 110 and ring 124 are both connected to rotate with input shaft 64, planetary gear 102 is restrained from rotation on pin 106. As a result, gear 102 revolves about shaft 64 without rotating about the axis of pin 106. Thus, planet carrier 104 is rotated to drive fan 22 at the rotational speed of input shaft 64.

In the second mode, when it is desired to move fan 22 at a reduced rpm relative to input shaft 64, ring 124 is moved to a position wherein pin 130 is simultaneously engaged with apertures 129,122 and 88 so that sun gear 110 is fixedly connected with torque arm 76. Sun gear 110 is now fixed in position relative to rotating input shaft 64, planetary gear 102 now rotates freely on pin 106 and simumltaneously revolves around shaft 64. Thus, gear teeth 100 of gear 102 walk around gear teeth 114 of sun gear 110. As a result, planet carrier 104 rotates and drives fan 22 to an rpm equal to the rpm of input shaft 64, times the number of teeth 98 on ring gear 96, divided by the sum of the number of teeth on ring gear 96, and the number of teeth of sun gear 110.

REVERSING GEARBOX

Figure 3:
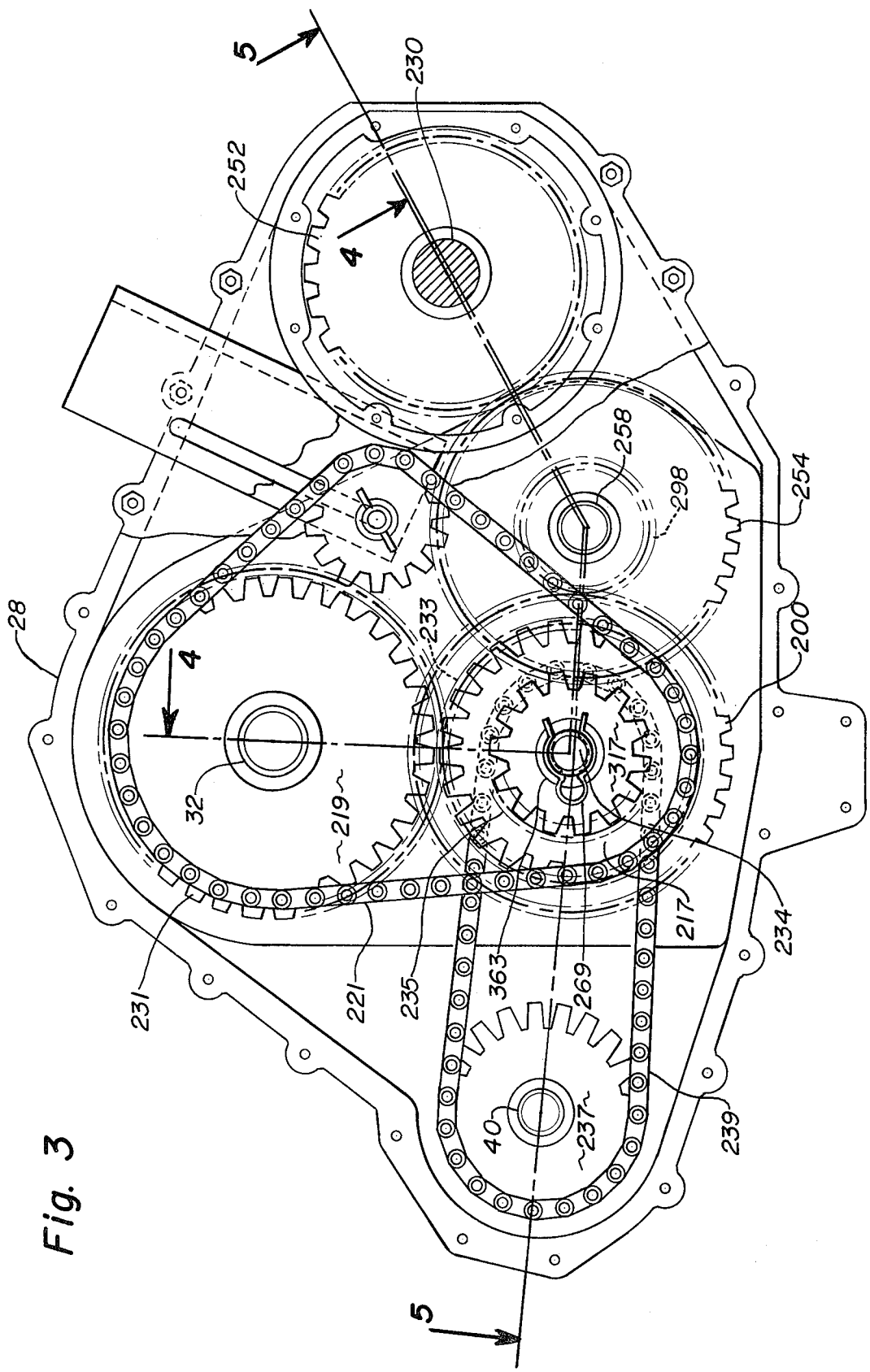
FIG. 3 is a diagrammatic end view illustrating an embodiment of the reversing gearbox of this invention.

A diagrammatic end view, FIG. 3 of reversing gearbox 28 illustrates spatial and drive relationships between various shafts rotating therein. An input shaft 230 has a meshing relationship inside gearbox 28 for driving a shaft 258. A gear 252 of shaft 230 meshes with a gear 254 of shaft 258. Shaft 258 has a meshing relationship inside gearbox 28 for driving a shaft 234. A gear 298 of shaft 258 meshes with a gear 200 of shaft 234. Outside gearbox 28, a sprocket 217 on shaft 234 drives a sprocket 219 on upper feedroll drive shaft 32 through a chain 221. Back inside gearbox 28, shaft 32 has a meshing relationship for driving a lower feedroll drive shaft 34 (FIG. 4) which is piloted on shaft 234. A gear 231 on shaft 32 meshes with a gear 233 on shaft 34. Also, inside gearbox 28, a sprocket 235 (FIG. 5) on shaft 234 drives a sprocket 237 on attachment drive shaft 40 through a chain 239.

Figure 4:
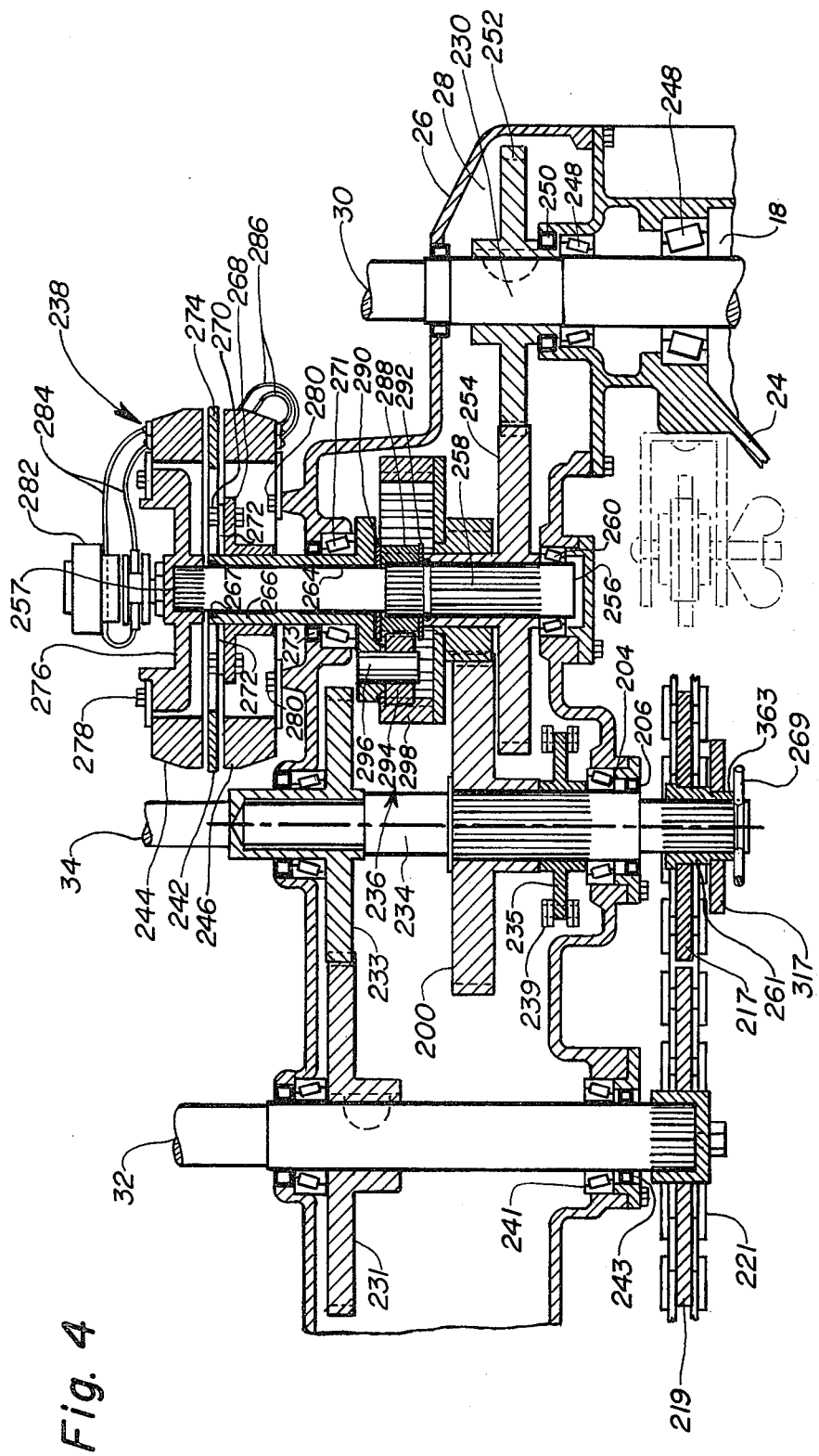
FIG. 4 is a sectional view taken along the line 4—4 of FIG. 3.
Figure 5:
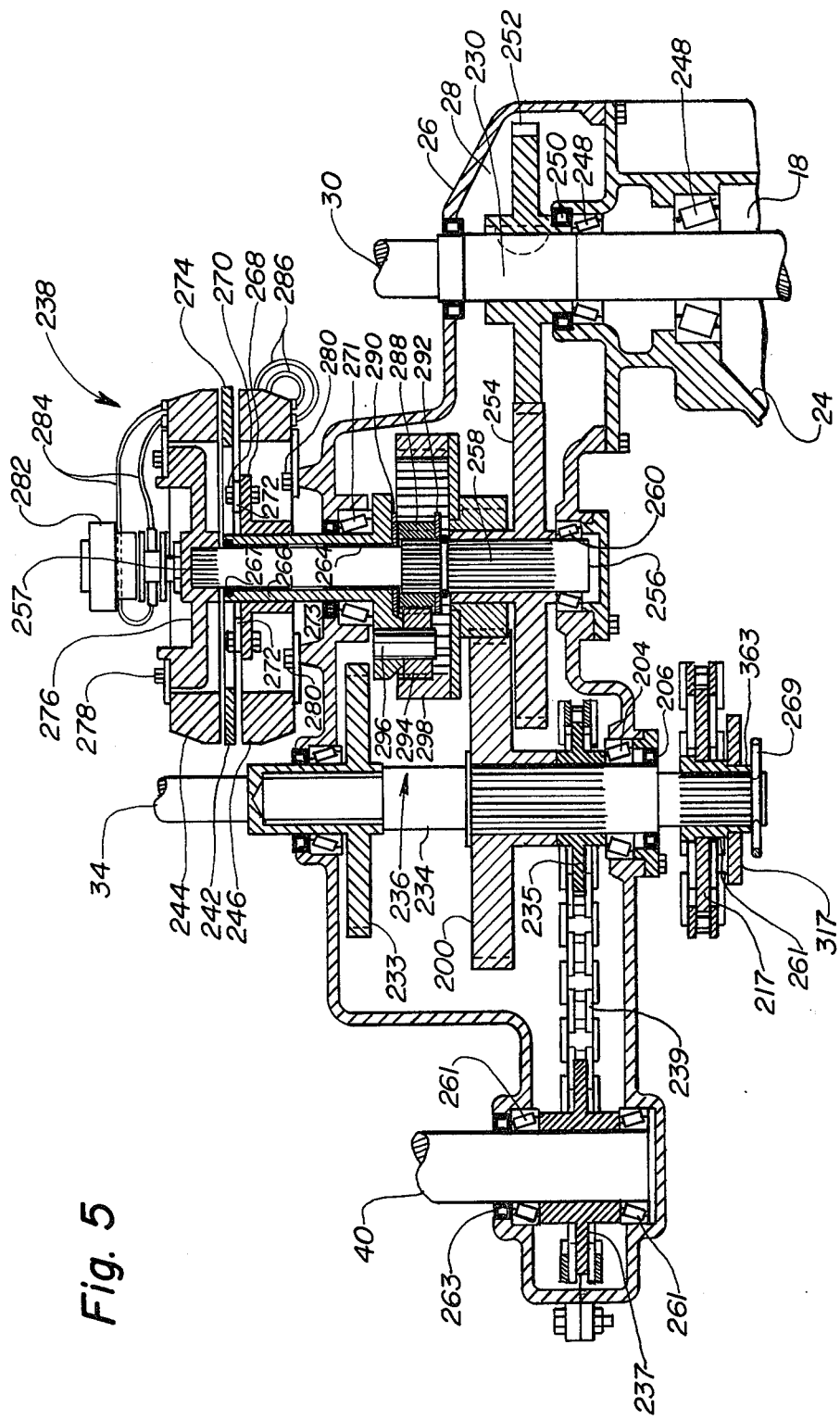
FIG. 5 is a sectional view taken along the line 5—5 of FIG. 3.

More specifically, in FIG. 4, the second output from main gearbox 18, FIG. 3, provides a single input to reversing gearbox 28 through shaft 230. This single input provides output to cutterhead drive shaft 30, feedroll drive shafts 32,34 and attachment drive shaft 40. Means, such as a planetary gear set 236, is operably interconnected with input shaft member 230 and output shaft member 234 for providing a forward mode, a reverse mode and a neutral mode to feedrolls 36 via output member 234. An electric clutch-brake device 238, operably interconnected with gear set 236, is mounted on housing 26 of gearbox 28 and includes an armature 242 disposed between an electrically actuated clutch magnet 244 and an electrically actuated brake magnet 246.

Shaft 230 is preferably of steel and is mounted for sealed counterclockwise rotation in housing 26 by suitable bearings 248 and seals 250. A steel gear 252 is keyed on shaft 230 and meshes with a steel gear 254 splined adjacent one end 256 of a steel shaft 258 mounted for clockwise rotation in housing 26 by suitable bearings 260. Another end 257 of shaft 258 extends from housing 26 and is rotatable within a bushing 264 which carries a planet carrier 266 splined to a hub 268. Carrier 266 is sealed on shaft 258 by suitable seals 267. Armature 242 is mounted for rotation with planet carrier 266 and hub 268 via bolts 270. Carrier 266 is rotatably mounted for sealed rotation in housing 26 by suitable bearings 271 and seals 273. A plurality of spring steel leaf springs 272, are connected between hub 268 and a fabricated steel armature plate 274, maintaining armature 242 normally spaced from clutch magnet 244 and brake magnet 246. Clutch magnet 244 is mounted on a hub 276 by bolts 278. Hub 276 is splined on shaft 258. Magnet 244 is a commercially available model number IXC-931 manufactured by Warner Electric Clutch and Brake Company. Brake magnet 246 is mounted on housing 26 by bolts 280. Magnet 246 is the same commercially available part as magnet 244. A well known brush holder 282 is provided on clutch-brake device 238 to interconnect electrical power from the towing vehicle (not shown) to clutch magnet 244 via wires 284. Brush holder 282 is commonly used to connect electrical wires between a stationary part and a rotating part.

A sun gear 288 is also splined on shaft 258 and is separated from carrier 266 by a thrust washer 290 and from gear 254 of another thrust washer 292. A planet gear 294, rotatably mounted on carrier 266 by pin 296, is intermeshed between sun gear 288 and a portion of ring gear 298. Gear 200 is splined on shaft 234 and meshes with ring gear 298. Sprocket 217 is mounted on shaft 234 as a means for providing drive to chain 221 and sprocket 219 on shaft 32. Shaft 234 is rotatably mounted and sealed in housing 26 by suitable bearings 204 and seals 206. In this manner, shaft 32 is always driven in the same direction as shaft 234. Shaft 32 is rotatably mounted and sealed in housing 26 by suitable bearings 241 and seals 243. Gear 231 is splined on shaft 32 and meshes with gear 233 on shaft 34. In this manner, shaft 34 is always driven in a direction opposite to the direction of shaft 32. Sprocket 235 is splined on shaft 234, see FIG. 5, as a means for providing drive to chain 239 and sprocket 237 on shaft 40. Shaft 40 is rotatably mounted and sealed in housing 26 by suitable bearings 261 and seals 263. In this manner, shaft 40 is always driven in the same direction as shaft 234.

Advantageously, all of the chain and gear drive relationships within housing 26, are free of the usual debris and contamination to which similar drives are exposed in prior art devices. The sprockets 217, 219 and the interconnected chain 221 are external to housing 26, but for good reason. Sprocket 217 can be quickly interchanged with various size sprockets thus changing the rpm relationship between shaft 234 and shaft 32 resulting in a change in rpm of feedrolls 36. As it is known, change in feedroll rpm changes the length of cut of crop material fed to the constant speed rotary cutterhead 38. In the drawings at FIGS. 4 and 5, it can be seen that a weld assembly 261 is splined on shaft 234 and includes a hub 363 carrying sprocket 217 of a first size and a sprocket 317 of a second size. A steel retaining pin 269 retains assembly 261 on shaft 234. When it is desired to change sprocket sizes, pin 269 can be removed and assembly 261 can be inverted to radially align one of the sprockets 217, 317 with sprocket 219. A number of assemblies such as assembly 261 can be used to provide various sprocket sizes as desired.

Input shaft 30 always drives shaft 258 in a clockwise direction. As a result, clutch magnet 244 normally rotates clockwise with shaft 258. Brake magnet 246 remains stationary due to being secured on stationary housing 26. Further, sun gears 288 continuously rotate clockwise with shaft 258.

With the parts assembled as set forth above, it can be seen that in the neutral mode, shaft 234, gear 200 and sprocket 217 are not rotating thus ring gear 298 is stationary. Planet gear 294 rotates about pin 296 in a counterclockwise direction and simultaneously revolves clockwise around sun gear 288 with carrier 266. Sun gear 288 continues to rotate clockwise with shaft 258. Due to the relation of the gears, armature 242 rotates clockwise at about two-thirds the rotational speed of shaft 258 which constantly rotates. Armature 242 is maintained spaced from clutch magnet 244 and brake magnet 246 by leaf springs 272.

In the forward mode, clutch magnet 244 is electrically actuated. Armature 242 is magnetically urged into engagement with clutch magnet 244 and rotates clockwise with shaft 258 and carrier 266. Sun gear 288 and ring gear 298 also rotate clockwise. Thus, planet gear 294 does not rotate about pin 266 but revolves around sun gear 288 with carrier 266. As a result, shaft 234, gear 200 and sprocket 217 rotate counterclockwise.

In the reverse mode, brake magnet 246 is electrically actuated. Armature 242 is magnetically urged into engagement with stationary brake magnet 246. Thus, rotation of armature 242 and carrier 266 are arrested and shaft 258 continues to rotate within bushing 264. Planet carrier 266 is also stationary but sun gear 288 rotates clockwise. As a result, planet gear 294 rotates counterclockwise on pin 296 but gear 294 does not revolve around sun gear 28 due to stationary carrier 266. Thus, ring gear 298 rotates counterclockwise and drives shaft 234, gear 200 and sprocket 217 clockwise.

The foregoing has described a forage harvester drive train having certain portions housed for protection from contamination and other portions exposed for ready access.

It is anticipated that aspects of the present invention, other than those specifically defined in the appended claims, can be obtained from the foregoing description and the drawings.

Having thus described the invention, what is claimed is:

1. In a forage harvester having a cutterhead for cutting crop material, and feed means for feeding crop material to said cutterhead, said feed means comprising pairs of cooperating upper and lower feedrolls, drive apparatus comprising a first and second gearbox each having an input, a first output of said first gearbox being said input of said second gearbox, means connected to said second gearbox input for driving said cutterhead, a planetary gear set operably mounted inside said second gearbox, means inside said second gearbox for operably interconnecting said second gearbox input and said planetary gear set, a drive member mounted in said second gearbox and a portion of said drive member extending outside said second gearbox, said drive member and said planetary gear set being interconnected inside said second gearbox, an upper feedroll drive shaft having a portion extending from said second gearbox and operably connected to said upper feedrolls, another portion of said upper feedroll drive shaft extending from said second gearbox, said another portion and said drive member being interconnected outside said second gearbox, a lower feedroll drive shaft connected to said lower feedrolls, said upper and lower feedroll drive shafts being interconnected inside said second gearbox, and an attachment drive shaft extending from said second gearbox, said attachment drive shaft and said drive member being interconnected inside said second gearbox.

2. The apparatus of claim 1 including
a forage blower,
a second output of said first gearbox, and
a planetary drive interconnecting said blower and second output.

3. The apparatus of claim 2 including:
a plurality of interchangeable drive sprockets mounted on said drive member outside said second gearbox.

4. In a forage harvester having
a cutterhead for cutting crop material,
feed rolls for feeding crop material to said cutterhead,
drive means for coupling said feed rolls and said cutterhead to a source of power,
said drive means comprising gearbox means including an enclosure for preventing the entry thereto of debris,
said drive means further comprising an input shaft rotatably driven by said source of power, first rotatable output means extending from said gearbox for driving said cutterhead, additional rotatable output means extending from said gearbox for driving said feed rolls,
means for varying the speed of said rotatable output means to vary the speed of said feed rolls, said means for varying comprising:
a drive member and a driven member extending out of said gearbox means, means outside said gearbox means for operably interconnecting said drive and driven members, said interconnecting means comprising a plurality of interchangeable pairs of drive and driven sprockets mounted on said drive and driven means outside said gear box means, whereby each pair of sprockets represents a ratio corresponding to a particular selected speed of said additional rotatable output means.

5. In a forage harvester as set forth in claim 4 wherein said feed rolls include an upper feedroll and a lower feedroll, and said additional rotatable output means comprise second and third rotatable output means extending from said gearbox enclosure, said second rotatable output means coupled to said upper feedroll and said third rotatable output means coupled to said lower feedroll to drive said upper and lower feedrolls under conditions where said input shaft is driven by said source of power.

* * * * *